United States Patent
Kimura (10) Patent No.: US 7,499,800 B2
(45) Date of Patent: Mar. 3, 2009

(54) VEHICLE NAVIGATION APPARATUS

(75) Inventor: Tsuyoshi Kimura, Iwaki (JP)

(73) Assignee: Alpine Electronics, Inc. (JP)

( * ) Notice: Subject to any disclaimer, the term of this patent is extended or adjusted under 35 U.S.C. 154(b) by 11 days.

(21) Appl. No.: 10/926,759

(22) Filed: Aug. 26, 2004

(65) Prior Publication Data
US 2005/0085994 A1    Apr. 21, 2005

(30) Foreign Application Priority Data
Aug. 27, 2003  (JP)  ............................. 2003-302781

(51) Int. Cl.
*G01C 21/26* (2006.01)
(52) U.S. Cl. .............. 701/208; 340/995.18; 340/995.24
(58) Field of Classification Search ................ 701/207, 701/208, 209, 210, 211, 212, 213; 370/252; 340/995.12, 995.24; 342/357.09
See application file for complete search history.

(56) References Cited

U.S. PATENT DOCUMENTS

| | | | | |
|---|---|---|---|---|
| 5,272,638 A * | 12/1993 | Martin et al. | ............. | 455/456.5 |
| 5,535,125 A * | 7/1996 | Okabe | ......................... | 701/211 |
| 5,583,494 A * | 12/1996 | Mizutani et al. | ....... | 340/995.14 |
| 5,729,217 A * | 3/1998 | Ito et al. | ...................... | 340/988 |
| 5,802,492 A * | 9/1998 | DeLorme et al. | ......... | 455/456.5 |
| 5,963,948 A * | 10/1999 | Shilcrat | ....................... | 707/100 |
| 6,075,467 A * | 6/2000 | Ninagawa | ............... | 340/995.14 |
| 6,094,618 A * | 7/2000 | Harada | ........................ | 701/207 |
| 6,128,571 A * | 10/2000 | Ito et al. | ...................... | 701/201 |
| 6,131,066 A * | 10/2000 | Ahrens et al. | ................ | 701/200 |
| 6,178,377 B1 * | 1/2001 | Ishihara et al. | .............. | 701/200 |
| 6,278,941 B1 * | 8/2001 | Yokoyama | ................... | 701/209 |
| 6,282,493 B1 * | 8/2001 | Kitagawa et al. | ............ | 701/211 |
| 6,317,718 B1 * | 11/2001 | Fano | .............................. | 705/1 |
| 6,427,118 B1 * | 7/2002 | Suzuki | ........................ | 701/209 |
| 6,487,495 B1 * | 11/2002 | Gale et al. | ................... | 701/209 |
| 6,549,847 B2 * | 4/2003 | Ikeuchi et al. | ............... | 701/208 |
| 6,587,782 B1 * | 7/2003 | Nocek et al. | ................. | 701/200 |
| 6,728,635 B2 | 4/2004 | Hamada et al. | | |
| 6,845,319 B2 * | 1/2005 | Uchida | ........................ | 701/208 |
| 6,937,936 B2 * | 8/2005 | Nimura | ....................... | 701/208 |
| 7,239,963 B2 * | 7/2007 | Suzuki | ........................ | 701/211 |
| 7,395,150 B2 * | 7/2008 | Ohira et al. | .................. | 701/208 |
| 7,406,665 B2 * | 7/2008 | Yokota | ........................ | 715/826 |

(Continued)

FOREIGN PATENT DOCUMENTS

JP    06-044490    2/1994

(Continued)

OTHER PUBLICATIONS

Japanese Office Action dated Aug. 28, 2007—Notification of Reasons for Refusal, Patent Application No. 2003-302781 with English translation.

*Primary Examiner*—Jack W. Keith
*Assistant Examiner*—Ari M. Diacou
(74) *Attorney, Agent, or Firm*—Brinks Hofer Gilson & Lione (57) ABSTRACT

A vehicle navigation apparatus that is capable of quickly providing information about a new facility to a user when the new facility is set up. The vehicle navigation apparatus includes information about a newly added facility. When a vehicle is approaching the new facility, an image representing the existence of the new facility is displayed on a map.

13 Claims, 7 Drawing Sheets

U.S. PATENT DOCUMENTS

| | | | | |
|---|---|---|---|---|
| 2001/0044802 A1* | 11/2001 | Hirono | .................... | 707/104.1 |
| 2002/0010542 A1* | 1/2002 | Ahrens et al. | ............... | 701/200 |
| 2002/0013658 A1* | 1/2002 | Tanaka et al. | ............... | 701/209 |
| 2002/0082773 A1 | 6/2002 | Ikeuchi et al. | | |
| 2003/0040850 A1* | 2/2003 | Najmi et al. | ................... | 701/1 |
| 2003/0144795 A1* | 7/2003 | Lin | ............................ | 701/213 |
| 2003/0182056 A1* | 9/2003 | Nozaki et al. | ............... | 701/209 |
| 2003/0220735 A1* | 11/2003 | Nimura | ..................... | 701/208 |
| 2004/0088110 A1* | 5/2004 | Suzuki | ...................... | 701/211 |
| 2004/0111213 A1* | 6/2004 | Iwamura et al. | ............. | 701/208 |
| 2005/0107949 A1* | 5/2005 | Yokota | ...................... | 701/209 |
| 2007/0126605 A1* | 6/2007 | Aleksic et al. | ......... | 340/995.14 |
| 2008/0234931 A1* | 9/2008 | Wang et al. | ................. | 701/209 |

FOREIGN PATENT DOCUMENTS

| | | |
|---|---|---|
| JP | 2001-67365 | 3/2001 |
| JP | 2002-188926 | 7/2002 |

\* cited by examiner

● : SIGN DISPLAY POINT

FIG.8

VEHICLE NAVIGATION APPARATUS

BACKGROUND OF THE INVENTION

1. Field of the Invention

The present invention relates to a vehicle navigation apparatus that establishes a communication connection with a data transmission center via a communications device and obtains various kinds of information from the data transmission center. More particularly, the invention is directed to a vehicle navigation apparatus that can provide information about a new facility to a user quicker.

2. Description of the Related Art

A conventional vehicle navigation apparatus includes a map-data storage device for storing map data, such as a digital versatile disk (DVD) or a hard disk, a display device such as a liquid crystal display or the like, and a vehicle position detector for detecting a present position of a vehicle and a present traveling direction thereof, such as a gyro, a global positioning system (GPS) receiver, and a vehicle speed sensor or the like. In the navigation apparatus, map data including information on the present vehicle position is read from the map-data storage device, and based on the map data read, a map image covering the present vehicle position and its surroundings is drawn and displayed on the display device with a vehicle position (location) mark superimposed on the map image. The navigation apparatus can render the map image scrollable or the vehicle position mark movable with the map image fixed on a screen as the vehicle travels, thus allowing a user to understand the present traveling position of the vehicle at first glance.

Generally, the vehicle navigation apparatus has the function of route guidance that enables the user to easily travel an appropriate route to a desired destination without taking a wrong path. This route guidance function automatically searches for a route with the lowest cost connecting a starting point to the destination by simulated calculation such as the lateral search method or the Dijkstra method using the map data, and the resultant route searched for is stored as a guidance route. During traveling, the guidance route is displayed on a map by a thick line in a different color from that of the other road. Alternatively or additionally, when the vehicle is approaching an intersection on the guidance route where to turn right or left, an arrow representing a traveling direction beyond the intersection is drawn at the intersection on the map image. This guides the user to the destination.

The aforesaid cost is set in terms of a value obtained by multiplying a distance of a road by a constant depending on the width of the road, the type of the road (general road, or highway), the direction of a turn, namely a right turn or a left turn, or the like, or in terms of a time required for the vehicle to pass through the road on the basis of the distance thereof. Thus, the cost is a numeric value indicating the degree of propriety as the guidance route. Even if there are two roads with the same distance, the cost depends on, for example, whether the user makes use of a highway or not, or whether the user gives a high priority to the distance or the time.

In recent years, a vehicle navigation apparatus has been developed that establishes a communication connection with a data transmission center outside the vehicle using a communications device such as a portable telephone or the like, and obtains the latest map data and other information from the data transmission center. For example, a vehicle navigation apparatus has been released which obtains "valuable information about a shop", together with the map data from the data transmission center, while announcing the "valuable information" by voice when the vehicle is approaching the shop. (See Pioneer Corporation Air Navi catalogue '02 Vol. 1.)

When some facilities of types (genres) associated with the user's favorites (for example, a convenience store, a CD shop, an amusement park, or the like) are newly set up, the user intends to know information about these facilities as quickly as possible. Thus, when a new facility appears, a vehicle navigation apparatus that provides information about the new facility to the user as quickly as possible is desired.

SUMMARY OF THE INVENTION

Accordingly, it is an object of the invention to provide a vehicle navigation apparatus that can provide information about a new facility as quickly as possible to a user when the new facility is set up.

To solve the foregoing problems encountered with the known art, according to one aspect of the present invention, there is provided a vehicle navigation apparatus comprising a storage medium for storing therein map data and facility data, a vehicle position detector for detecting a present position of a vehicle, a display device, a communications device for establishing communication connection with a data transmission center outside the vehicle, and a controller for reading out the map data stored in the storage medium based on the vehicle position detected by the vehicle position detector to display a map on the display device, while updating the map data and the facility data stored in the storage medium by obtaining another map data and another facility data from the data transmission center via the communications device, wherein, in a case where the facility data obtained from the data transmission center includes information about a new facility, when the vehicle is approaching the new facility, the controller displays an image representing existence of the new facility on the map displayed on the display device.

With this embodiment of the present invention, the another new map data and the another new facility data are obtained from the data transmission center via the communications device, thereby updating the map data and the facility data stored in the storage medium. In a case where the facility data includes the information about the new facility, the controller checks a distance between the new facility and the vehicle. If the distance between the vehicle and the new facility reaches a specified distance, the image representing the existence of the new facility is displayed on the map. This allows a user to recognize the existence of the new facility as quickly as possible.

It should be noted that the new facility in the present invention means a facility newly added to the facility data, such as a shop, a park, an amusement park, or the like.

To prevent the user from forgetting the existence of the new facility, with the image of the new facility displayed on the map image, the existence of the new facility may be preferably announced by voice, or the image representing the existence thereof may be preferably displayed a plurality of times as the vehicle travels.

DESCRIPTION OF PREFERRED EMBODIMENTS

Some preferred embodiments of the present invention will be described hereinafter with reference to the accompanying drawings.

Figure 1:
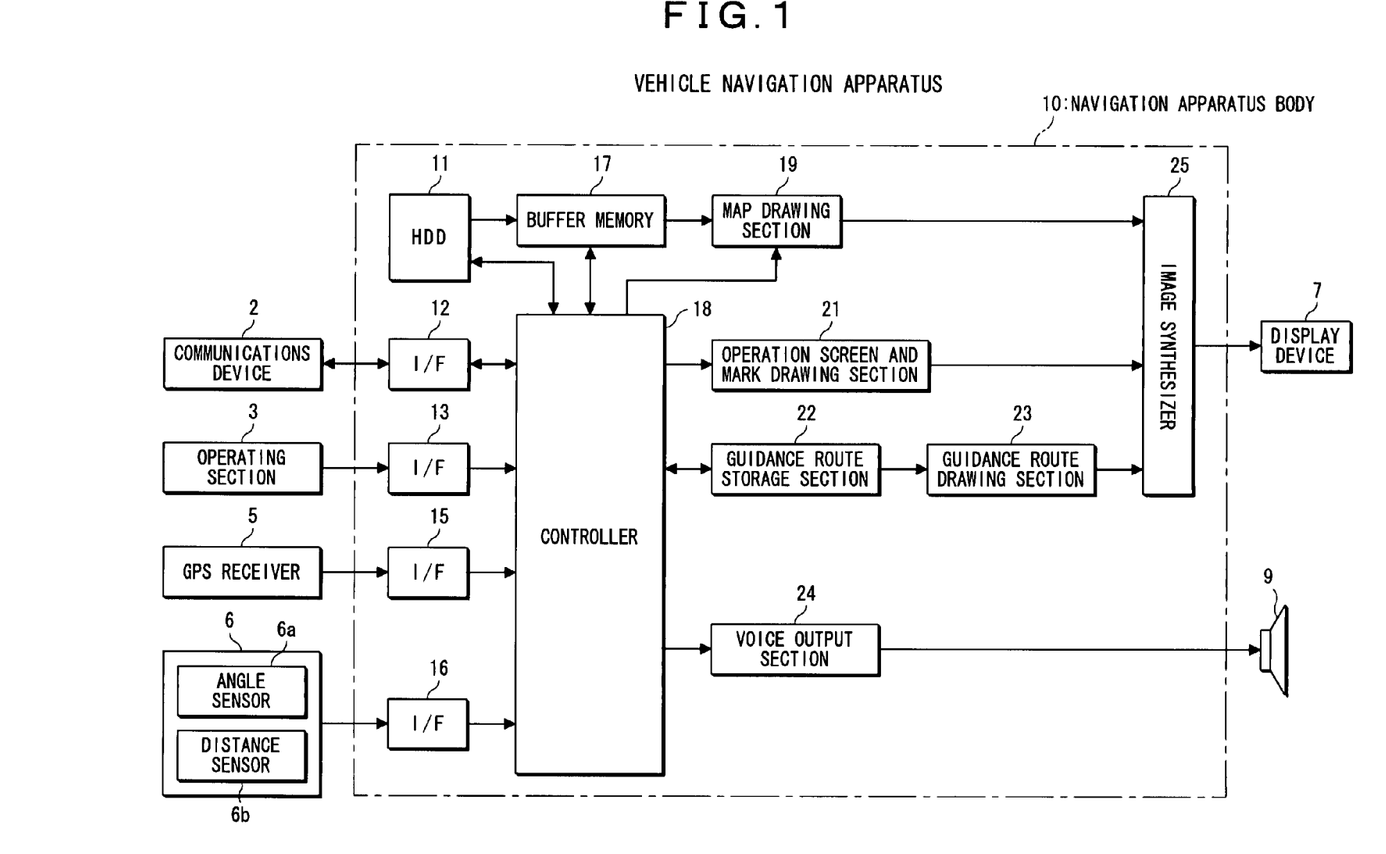
FIG. 1 is a block diagram showing a configuration of a vehicle navigation apparatus according to one preferred embodiment of the present invention.

FIG. 1 shows a block diagram of a configuration of a vehicle navigation apparatus according to one preferred embodiment of the present invention. As shown in FIG. 1, reference numeral 2 denotes a communications device for communicating with a data transmission center. Reference numeral 3 denotes an operating section having various operating buttons or the like for operating a navigation apparatus body 10, which is described later.

Reference numeral 5 denotes a GPS (global positioning system) receiver for receiving a GPS signal transmitted from a GPS satellite to detect longitude and latitude of a present position of a vehicle. Reference numeral 6 denotes a self-contained navigation sensor, which includes an angle sensor 6a such as a gyro for detecting a rotation angle of the vehicle, and a traveling distance sensor 6b for generating a pulse at regular travel intervals. Reference numeral 7 denotes a display device that is capable of displaying a map image, such as a liquid crystal panel. On this display device 7, the navigation apparatus body 10 displays a map covering the present position of the vehicle and its surroundings, or various kinds of guidance information including a guidance route from a starting point to a destination, a mark indicating the vehicle position, and the like. Reference numeral 9 denotes a speaker for providing the user with the guidance information by voice.

The navigation apparatus body 10 is composed of the following components.

Figure 2:
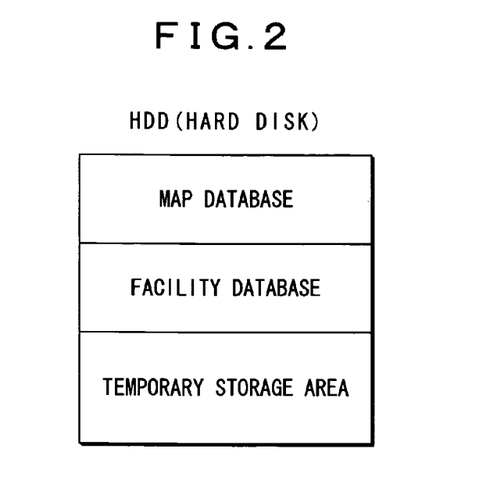
FIG. 2 is a schematic view of a map database storage area, a facility database storage area, and a temporary storage area, all of which are provided in a HDD.

Reference numeral 11 denotes a HDD (hard disk drive) that stores therein a map database and a facility database. The map database is divided into a plurality of blocks of map data, each having an appropriate latitudinal width and an appropriate longitudinal width in accordance with a reduced scale. To each block of the map data is added corresponding version information, which notifies the user of an updating date of the map data block. Also, the facility database is divided into a plurality of blocks of facility data. The plural blocks of the facility data have, for example, information about many facilities, which are classified into types (namely, the types such as a convenient store, a CD shop, an amusement park, or the like), which information includes a name of each facility, a position thereof (longitude and latitude thereof), an address thereof, a telephone number thereof, and other information. To each block of the facility data is added corresponding version information, which notifies the user of an updating date of the facility data block. Further, in the HDD 11 is provided a temporary storage area for temporarily storing information about the new facility, which is described later, as shown in FIG. 2.

An interface, indicated at 12, is connected to the communications device 2. An interface, indicated at 13, is connected to the operating section 3. An interface, indicated at 15, is connected to the GPS receiver 5. An interface, indicated at 16, is connected to the self-contained navigation sensor 6.

Reference numeral 17 denotes a buffer memory for temporarily storing the map data read from the HDD 11. Reference numeral 18 denotes a controller composed of a microcomputer. The controller 18 carries out various kinds of processing, that is, detects the present position of the vehicle based on signals inputted from the interfaces 15 and 16, reads the predetermined block of the map data from the HDD 11 in the buffer memory 17, and searches for a guidance route from the starting point to the destination under a searching condition set by the use of the map data read in the buffer memory 17.

Reference numeral 19 denotes a map drawing section for drawing or rendering the map image using the map data read in the buffer memory 17. Reference numeral 21 denotes an operation screen and mark drawing section for drawing or rendering various types of menu screens (operation screens) depending on operation conditions, and various kinds of marks including a vehicle position mark, a cursor, and the like.

Reference numeral 22 denotes a guidance route storage section for storing the guidance route searched for by the controller 18. Reference numeral 23 denotes a guidance route drawing section for drawing or rendering the guidance route. The guidance route storage section 22 stores all nodes of the guidance route from the starting point to the destination and which route has been searched for by the controller 18. The guidance route drawing section 23 reads guidance route information (node rows) from the guidance route storage section 22 to draw the guidance route using a line with different color and thickness from those of other roads.

Reference numeral 24 denotes a voice output section for supplying a voice signal to the speaker 9 based on a signal from the controller 18. Reference numeral denotes an image synthesizer for superimposing various marks and the operation screen drawn by the operation screen and mark drawing section 21 and the guidance route drawn by the guidance route drawing section 23 on the map image drawn by the map drawing section 19, to display them on the display device 7.

In the vehicle navigation apparatus with such an arrangement, the controller 18 detects the present position of the vehicle and the traveling direction thereof from the GPS signals received by the GPS receiver 5 and signals inputted from the self-contained navigation sensor 6. The map data covering the present vehicle position and its surroundings is read from the HDD 11 to be stored in the buffer memory 17. The map drawing section 19 generates the map image based on the map data, which has been read in the buffer memory 17 from the HDD, to display the map image covering the present vehicle position and its surroundings on the display device 7, while displaying the vehicle position mark indicative of the present vehicle position on the map image. Thereafter, the controller 18 moves the vehicle position mark on the map image or scrolls the map image as the vehicle travels.

Once the user sets the destination by operating the operating section 3, the controller 18 searches for the guidance route from the starting point to the destination with the present vehicle position set as the starting point, under a pre-set condition, and then stores the guidance route obtained by the route search in the guidance route storage section 22. Subsequently, the controller 18 outputs appropriate guidance information as the vehicle travels to guide the vehicle to the destination along the guidance route.

Figure 3:
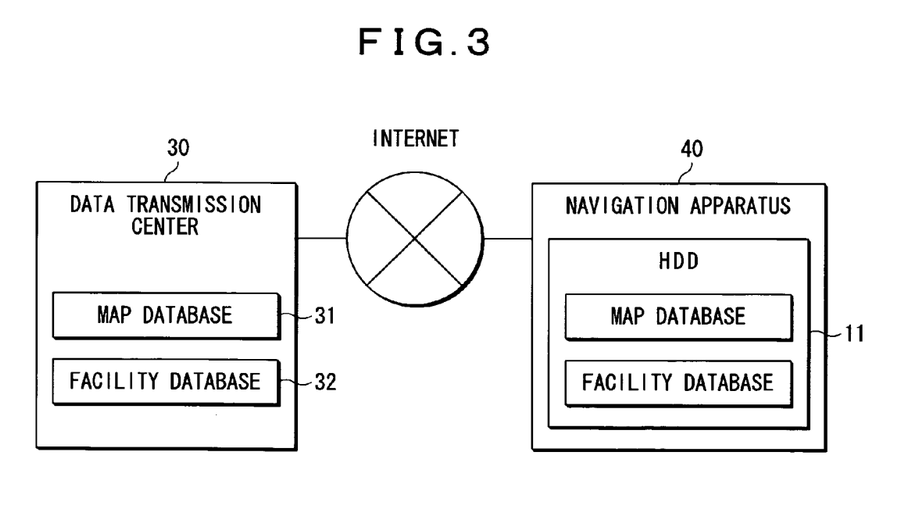
FIG. 3 is a schematic view showing a method of updating map data and facility data in the vehicle navigation apparatus of the preferred embodiment.

FIG. 3 is a schematic view showing a method of updating the map data and the facility data in the vehicle navigation apparatus of the present embodiment.

A data transmission center 30 includes a map database 31 composed of the latest map data about maps of all regions of a country, and a facility database 32 composed of the latest facility data about facilities in all regions of the country. The map data stored in the map database 31 is divided into blocks each having an appropriate latitudinal width and an appropriate longitudinal width in accordance with a reduced scale. The map data in each block is provided with corresponding version information. Similarly, the facility data stored in the facility database 32 is divided into blocks, and the facility data in each block is provided with corresponding version information. Moreover, a flag is added or appended to a part of the facility data, the part concerning the facility newly added (new facility), thereby distinguishing the new facility from other facilities.

The vehicle navigation apparatus 40 is suitably connected to the data transmission center 30 via the Internet to obtain the latest map data and facility data, thereby updating the map data and the facility data stored in the HDD 11.

Figure 4:
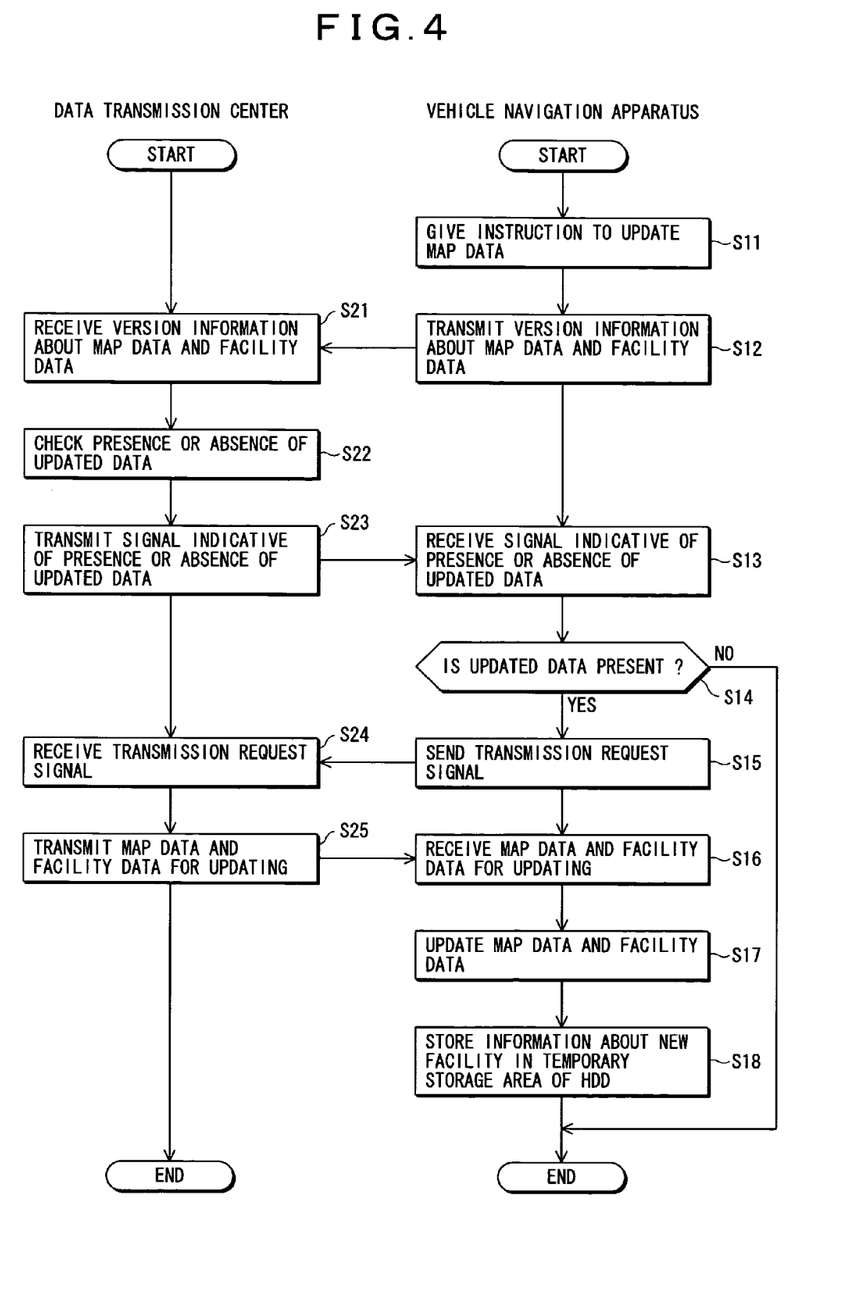
FIG. 4 is a flowchart showing an operation performed when updating the map data and the facility data stored in the HDD of the vehicle navigation apparatus according to the preferred embodiment.

Now, the operation performed when updating the map data and the facility data stored in the HDD 11 of the vehicle navigation apparatus 40 will be explained with reference to the flowchart of FIG. 4. In this example, map data and facility data concerning a point pre-registered as the user's house and its surroundings are updated, but the invention is not limited thereto. The present vehicle position or an arbitrary point may be designated, and map data and facility data about the designated point and its surroundings may be updated.

At act S11, a user gives the navigation apparatus an instruction to update map data concerning an area around the user's house. Then the operation proceeds to act S12, wherein the controller 18 extracts from the HDD 11 version information about the map data and the facility data corresponding to an area within a predetermined range with the point registered as the user's house centered to transmit it to the data transmission center 30 via the communications device 2.

The data transmission center 30 receives the version information about the map data and the facility data from the vehicle navigation apparatus 40 at act S21. Thereafter, at act S22, the transmission center 30 checks the presence or absence of updated map data and facility data.

That is, in the data transmission center 30, the version information about the map data received from the vehicle navigation apparatus 40 is compared with the version information about the corresponding block of the map data stored in the map database 31, whereby it is checked or determined whether a newer version of the map data than the map data stored in the vehicle navigation apparatus is stored in the map database 31 or not. Similarly, the version information about the facility data transmitted from the vehicle navigation apparatus 40 is compared with the version information about the corresponding block of the facility data stored in the facility database 32, whereby it is checked or determined whether a newer version of the facility data than the facility data stored in the vehicle navigation apparatus 40 is stored in the facility database 32.

Thereafter, at act S23, the data transmission center 30 transmits a signal indicative of the presence or absence of updated map data and updated facility data to the vehicle navigation apparatus 40 based on the comparison result of the version information. In this example, assuming that newer versions of the map data and the facility data than the map data and the facility data stored in the vehicle navigation apparatus 40 are stored in the data transmission center 30, the operation will be explained.

After the vehicle navigation apparatus 40 receives the signal indicative of the presence or absence of the updated map and facility data from the data transmission center 30 at act S13, the operation proceeds to act S14. If it is found at act S14 that there are no updated map data and facility data (if No), a message that there is no new data, or the like, is displayed on the display device 7, which terminates the processing.

On the other hand, if it is found at act S14 that at least one of the map data and the facility data has been updated in the data transmission center (if Yes), the operation proceeds to act S15. At act S15, the controller 18 of the vehicle navigation apparatus 40 sends a transmission request signal for requesting transmission of the updated map data or facility data, to the data transmission center 30.

After the data transmission center 30 receives the transmission request signal from the vehicle navigation apparatus 40 at act S24, the operation proceeds to act S25. At act S25, a corresponding block of the map data and the facility data for updating is read from the map database 31 and the facility database 32, and then the map data and the facility data for updating are transmitted to the vehicle navigation apparatus 40.

After the vehicle navigation apparatus 40 receives the map data and the facility data for updating from the data transmission center 30 at act S16, the operation proceeds to act S17. At act S17, the controller 18 replaces a corresponding block of the map data and the facility data stored in the HDD 11 with the received data for updating. Thereafter, the controller 18 announces and displays the completion of updating of the data on the display device 7.

Subsequently, at act S18, the controller 18 searches for information about the new facility through the updated facility data to store it in the temporary storage area of the HDD 11.

Thus, in the vehicle navigation apparatus of the present embodiment, when the facility data is updated, the information about the new facility is stored in the temporary storage area of the HDD 11. This new facility information stored in the temporary storage area will be automatically deleted or canceled after a specified period of time (e.g., 30 days) has elapsed.

It should be noted that although, in the present embodiment, information about the facility newly added, namely, information about the new facility, is identified by a flag added thereto, the invention is not limited thereto. For example, the yet-to-be-updated facility data may be compared with the facility data for updating, so that the information about the new facility may be extracted and then stored in the temporary storage area of the HDD 11.

Figure 5:
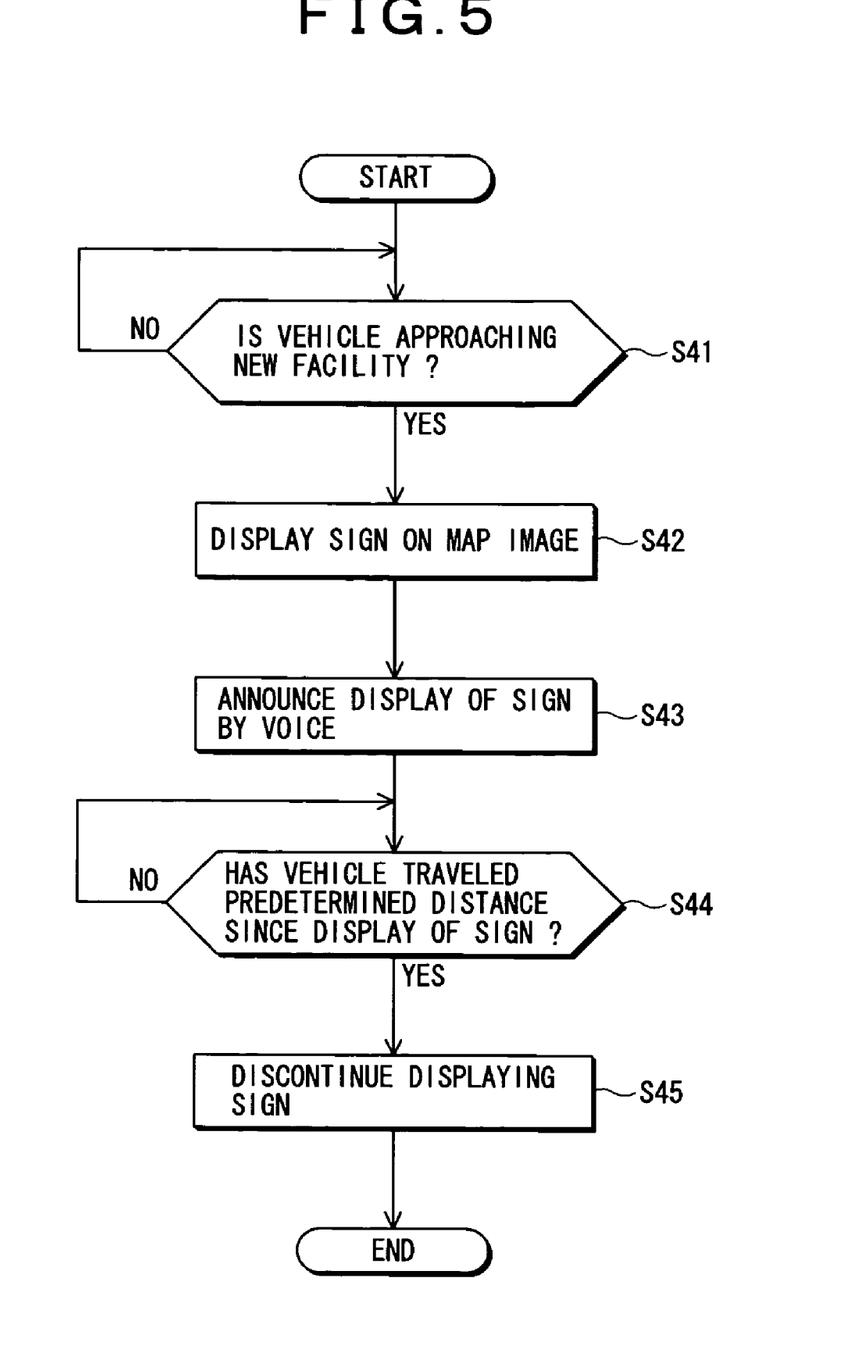
FIG. 5 is a flowchart showing a method of displaying information about a new facility in the vehicle navigation apparatus of the preferred embodiment.

Now, a method of displaying the information about the new facility in the vehicle navigation apparatus of the present embodiment will be explained with reference to a flowchart of FIG. 5.

The controller 18 constantly detects the present position of the vehicle based on outputs from the GPS receiver 5 and the self-contained navigation sensor 6 during travel of the vehicle. At act S41, the controller 18 reads out the new facility information stored in the temporary storage area of the HDD 11, and determines whether a distance between the vehicle and the new facility reaches a predetermined distance (for example, 300 m) or not. If the predetermined distance is reached, the operation proceeds from act S41 to act S42.

Figure 6:
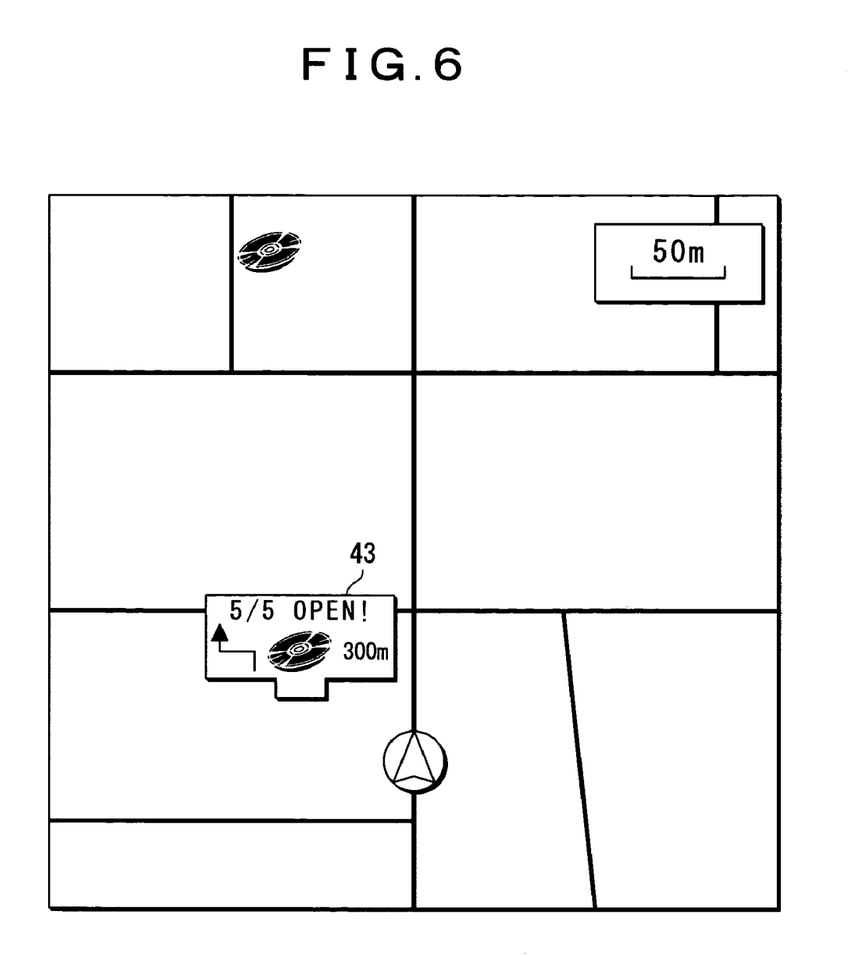
FIG. 6 is a diagram showing an example in which a sign to announce the existence of the new facility is displayed on a screen.

At act S42, the controller 18 reads the new facility information from the HDD 11 to generate a guidance image of the new facility. This guidance image of the new facility is superimposed on the map displayed on the display device 7. In the present embodiment, the guidance image of the new facility 43 is generated in the form of signs that are disposed by a road, as shown in FIG. 6. The guidance image of the new facility displayed on the map is hereinafter referred to as the sign. In the example of FIG. 6, an opening date of the new facility, an icon representing a type of the new facility (in this example, an icon representing a CD shop), and an arrow representing a simple route to the new facility are displayed in the sign (guidance image) 43.

Then, at act S43, the vehicle navigation apparatus 40 outputs by voice message that after 300 m a new facility exists, thereby announcing the existence of the new facility and the display of the sign 43 on the screen to the user.

Thereafter, at act S44, the controller 18 checks or determines whether the vehicle has traveled a longer distance than a predetermined distance (for example, 100 m) since the display of the sign 43. If it is determined that the vehicle has traveled a longer distance than the predetermined distance, the operation proceeds to act S45, wherein displaying the sign 43 is discontinued. Note that after a predetermined period of time has elapsed since the display of the sign 43, displaying the sign 43 may be discontinued.

As mentioned above, the vehicle navigation apparatus 40 of the present embodiment obtains the information about the new facility from the data transmission center 30. When the vehicle is approaching the new facility, the sign 43 is displayed on the map, and the existence of the new facility is announced by voice. This allows the user to recognize the existence of the new facility as quickly as possible.

It should be noted that although, in the aforesaid embodiments, the sign 43 is displayed regardless of the type of the new facility, the invention is not limited thereto. For example, the user may pre-register the facility type of some interest, and then only a sign 43 representing a new facility of the pre-registered type may be displayed.

Figure 7:
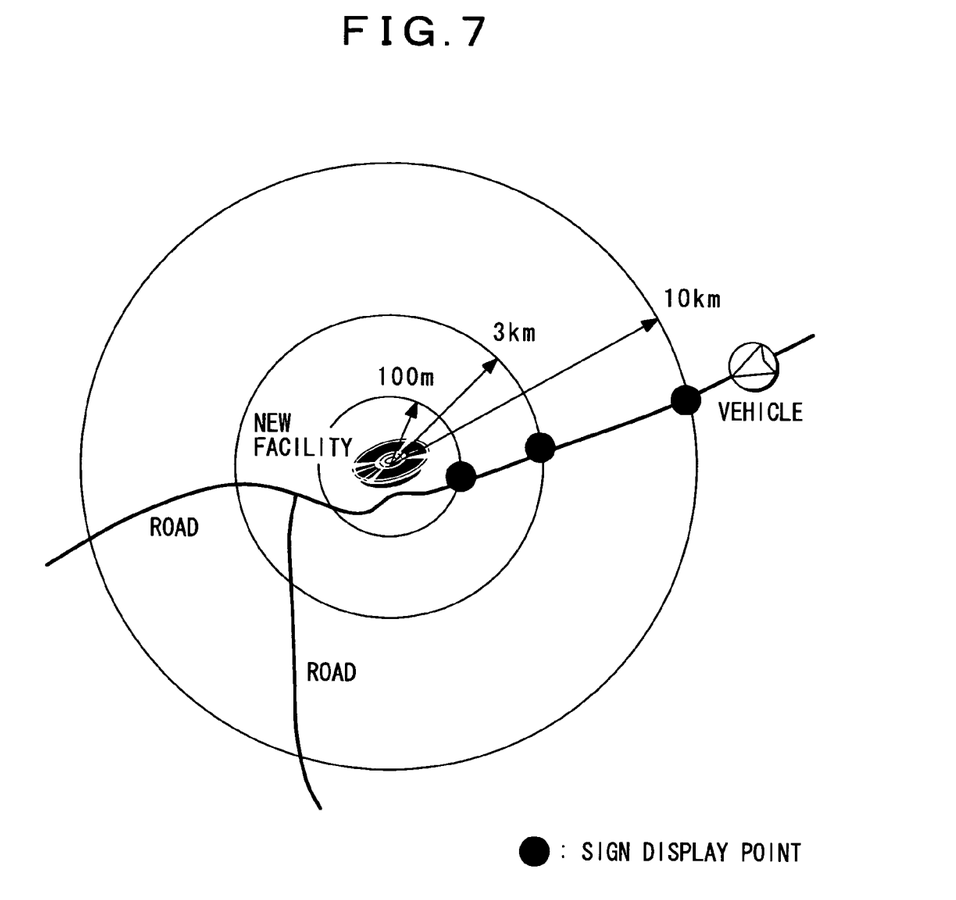
FIG. 7 is a schematic view of positions where signs are displayed.
Figure 8:
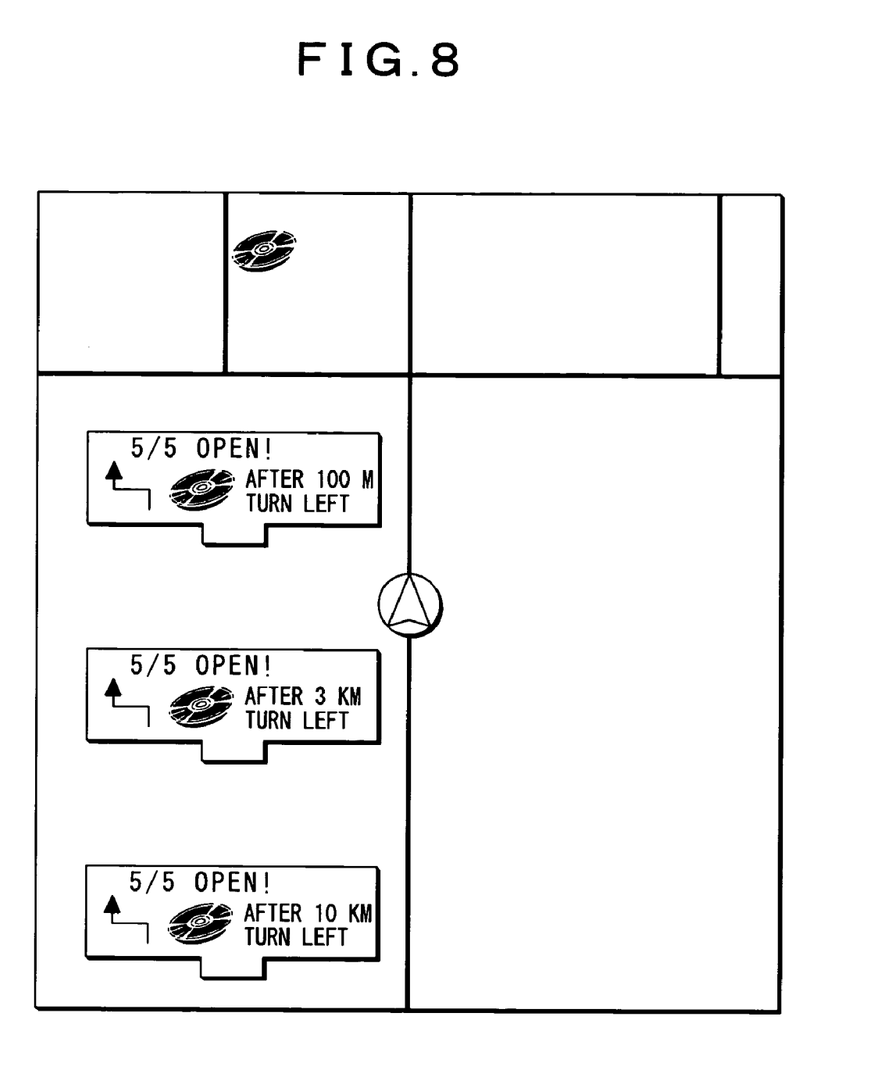
FIG. 8 is a schematic view showing an example in which the sign is displayed a plurality of times as the vehicle travels.

Further, the sign 43 representing the existence of the new facility may be preferably displayed several times as the vehicle travels. For instance, every time the vehicle is approaching points located 10 km, 3 km, and 100 m away from the new facility as shown in a schematic view of FIG. 7, the signs 43 are displayed as shown in FIG. 8, and the existence of the new facility is announced by voice. Thus, providing guidance of the new facility several times as the vehicle travel prevents the user from forgetting the existence of the new facility.

Moreover, although the only existence of the new facility is announced to the user in the above embodiments, the invention is not limited thereto. For instance, a touch panel may be disposed in front of the display device 7, in which, by pressing the sign 43 on a screen of the panel with a finger, detailed information about the new facility (e.g., an address, a telephone number, and the like) may be displayed.

Alternatively, a route search for a guidance route may be instructed with the new facility set as the destination, and then guiding the vehicle to the new facility along the guidance route may be started. This enables the user to know the more detailed information about the new facility and to easily reach the new facility.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A method of vehicle navigation comprising the acts of:
providing a storage medium in a vehicle, the storage medium operable to store map data and facility data;
providing a vehicle position detector operable to detect a present position of a vehicle;
providing a display device;
providing a communications device operable to establish communication connection with a data transmission center outside the vehicle;
reading map data stored in the storage medium based on the vehicle position detected by the vehicle position detector to display a map on the display device;
updating map data and facility data stored in the storage medium based on other map data and other facility data obtained from the data transmission center via the communications device, the other map data and other facility data comprising data regarding a recently established facility;
displaying a unique image representing the existence of the recently established facility on the map on the display device when the vehicle approaches the recently established facility, wherein the unique image distinguishes the recently established facility on the map from facilities that are not recently established;
saving information about the recently established facility in a temporary storage area of the storage medium; and
deleting information about the recently established facility stored in the temporary storage area after a specified period of time has elapsed;
wherein the recently established facility is displayed irrespective of a request regarding the recently established facility.

2. The vehicle navigation method of claim 1, wherein obtaining other map data and facility data comprises obtaining map data and facility data corresponding to an area within a predetermined range with an arbitrary point centered from said data transmission center via said communications device.

3. The vehicle navigation method of claim 1, wherein the act of displaying an image representing the existence of the recently established facility on the map on the display device comprises displaying an opening date of the recently established facility, an image representing a facility type of the recently established facility, a simple arrow image representing a route from the vehicle to the recently established facility, or a distance from the vehicle to the recently established facility.

4. The vehicle navigation method of claim 1, further comprising the act of announcing the existence of the recently established facility by voice.

5. The vehicle navigation method of claim 1, further comprising the act of deleting the image representing the existence of the recently established facility when vehicle travel has exceeded a predetermined distance or when a predetermined period of time has elapsed.

6. The vehicle navigation method of claim 1, wherein the image representing the existence of the recently established facility is of a pre-registered type from among the facility data obtained from said data transmission center.

7. The vehicle navigation method of claim 1, wherein the image representing the existence of the recently established facility is displayed a plurality of times as the vehicle travels.

8. The vehicle navigation method of claim 1, wherein the image representing the existence of the recently established facility is displayed every time a distance between the vehicle and the recently established facility reaches a predetermined distance.

9. The vehicle navigation method of claim 1 further comprising the acts of searching for a guidance route to the recently established facility, and guiding the vehicle to the recently established facility along the guidance route.

10. A method of guiding a vehicle to a recently established facility in a vehicle navigation apparatus, comprising the acts of:

obtaining facility data about a recently established facility from a data transmission center;

displaying a unique image representing existence of the recently established facility on the map image when the vehicle is approaching the recently established facility, wherein the unique image distinguishes the recently established facility on the map image from facilities that are not recently established;

saving information about the recently established facility in a temporary storage area of a storage medium; and deleting information about the recently established facility stored in the temporary storage area after a specified period of time has elapsed;

wherein the recently established facility is displayed irrespective of a request regarding the recently established facility.

11. The method of claim 10, wherein the image representing the existence of the recently established facility includes an opening date of the recently established facility, an image representing a facility type of the recently established facility, a simple arrow image representing a route from the vehicle to the recently established facility, or a distance from the vehicle to the recently established facility.

12. The method of claim 10, wherein the act of displaying the image representing the existence of recently established facility is performed a plurality of times as the vehicle travels.

13. The method of claim 10, further comprising the acts of searching for a guidance route from the vehicle to the recently established facility when the image representing the existence of the recently established facility is designated by a user, and guiding the vehicle to recently established facility along the guidance route.

* * * * *